United States Patent [19]

Pinkas et al.

[11] Patent Number: 5,214,700
[45] Date of Patent: May 25, 1993

[54] METHOD FOR OBTAINING A SECURITIZED CLEARTEXT ATTESTATION IN A DISTRIBUTED DATA PROCESSING SYSTEM ENVIRONMENT

[75] Inventors: Denis Pinkas, Chaville; Philippe Caille, Gambais, both of France

[73] Assignee: Bull S.A., Paris, France

[21] Appl. No.: 697,408

[22] Filed: May 9, 1991

[30] Foreign Application Priority Data

May 10, 1990 [FR] France ................. 90 05829

[51] Int. Cl.⁵ .................... H04L 9/32; H04L 9/30
[52] U.S. Cl. ........................... 380/25; 380/23; 380/30; 380/49; 340/825.31; 340/825.34
[58] Field of Search ............. 380/3, 4, 23, 24, 25, 380/30, 49, 50; 340/825.31, 825.34

[56] References Cited

U.S. PATENT DOCUMENTS

| | | | |
|---|---|---|---|
| 4,723,284 | 2/1988 | Munck et al. | 380/25 |
| 4,868,877 | 9/1989 | Fischer | 380/25 |
| 4,908,861 | 3/1990 | Brachtl et al. | 380/25 |
| 4,919,545 | 4/1990 | Yu | 380/25 |
| 4,935,962 | 6/1990 | Austin | 380/25 |
| 4,941,173 | 7/1990 | Boule et al. | 380/25 |
| 4,956,863 | 9/1990 | Goss | 380/30 |
| 5,005,200 | 4/1991 | Fischer | 380/30 |

FOREIGN PATENT DOCUMENTS 6172436 8/1986 Japan .

OTHER PUBLICATIONS

Proceedings of the 7th Annual Joint Conference of the IEEE Computer and Communications Societies; Networks: Evolution or Revolution?, Mar. 27-31, 1988; pp. 1105-1109; IEEE, New York, "A Security Imbedded Authentication Protocol".

"Integrating Crytography in ISDN", Lecture Notes in Computer Science, Advances in Cryptology—Crypto '87 Proceedings, 1987, pp. 9-18, Springer-Verlag, Berlin.

Primary Examiner—Bernarr E. Gregory
Attorney, Agent, or Firm—Weingarten, Schurgin, Gagnebin & Hayes

[57] ABSTRACT

A method for obtaining at least one securitized cleartext attestation by at least one requestor subject coupled to a data processing system and communicating with each other through a network. The data processing system includes a plurality of subjects and an authority represented by at least one server acting on behalf of the authority and issuing attestations. The requestor subject sends the authority an attestation request including at least one protection datum. The requestor subject chooses, at random, a check datum which is associated and linked with the protection datum. The requestor subject then transmits, in cleartext, to the authority both a piece of identification information defining the relationship between the check datum and the protection datum, and the protection datum itself. The server organizes the attestation in the form of binary information and calculates at least one of a signature and a seal of attestation taking into account the protection datum and the identification information. The server then transmits the sealed or signed attestation, in cleartext, to the requestor subject. A method for providing a chaining value for the check datum when multiple subjects request sequential attestation of a message is also provided.

10 Claims, 2 Drawing Sheets

METHOD FOR OBTAINING A SECURITIZED CLEARTEXT ATTESTATION IN A DISTRIBUTED DATA PROCESSING SYSTEM ENVIRONMENT

FIELD OF THE INVENTION

The present invention relates to a method for obtaining and transmitting one or more securitized cleartext attestations by a requestor using a distributed data processing system. It is designed in particular to ensure protection of one or more attestations, attributed to one or more users of the system, when they are obtained and when they are being transferred from one subject to another.

BACKGROUND OF THE INVENTION

In general, a distributed data processing system comprises a plurality of computers, each of which can run a large number of application programs allowing various tasks to be accomplished (invoice calculation, payroll calculation, railroad and aircraft ticket reservations, looking up telephone numbers, etc.) as well as a plurality of terminals or stations which can be directly accessed by individuals (screen terminals, keyboard terminals, etc.). The elements of which a distributed data processing system is composed (terminals and computers) are connected together by a data transmission network, also called telecommunications network, and communicate through a transmission line (telephone wires, coaxial, bus).

In general, the users of a distributed data processing system are either physical individuals or computer programs. The users are also called subjects. In a data processing system, these subjects can only access the various elements of which the system is composed if they have an attestation. The attestations thus furnished are personal, i.e. particular to each subject who is the legitimate owner, and confer on him rights in the distributed data processing system. Thus, for example, in a company only those responsible for payroll may access the employee salary records and make payments at the end of each month. Thus the attestations they receive explicitly define the right to access these records and pay the personnel. It is important for each attestation supplied to a given subject using a data processing system not to be stolen therefrom or obtained by other subjects. Hence it needs to be protected.

In data processing systems, the attestation is created in the form of a transmissible set of pieces of binary information. It is important for it to be transmissible directly between the various subjects authorized to possess it. An attestation must be protected when it is obtained (when it is created, see below) and when it is transferred from one subject to another who is authorized to possess it.

An attestation may be created either by a physical individual or more generally by an authority. This term must be construed in the broadest sense, namely any physical individual or legal entity (or their duly accredited agents or representatives) who have the right or power to command and be obeyed. Thus, in a company, the authority is the head of the company and his agents or representatives in specific activity areas of the company. Thus for example it may be the head of the payroll department. This authority may for example be represented by at least one special program run on one of the central processing units of the data processing system, which program may be called security attribute server. It must be pointed out that an attestation in the English terminology used in particular by the ECMA (European Computer Manufacturers Association) is designated "PAC" which means Privilege Attribute Certificate. In the language used by computer professionals, an attestation is also known by the terms token or ticket.

In order better to understand the gist of the invention, it is useful to give some background in cryptography.

A piece of cleartext information is binary information whose semantics may be understood by any subject using the data processing system. In particular, if one of the subjects is listening to the transmission line through which the cleartext information is passing, knowledge of the data routing protocol enables him to read and understand this information.

Encryption is an operation that involves converting cleartext information into encrypted information to render it unintelligible by any subject unaware of the mathematical encryption function F and/or the encryption key attached to this function by which the cleartext information is converted into encrypted information.

Decryption is the opposite of encryption when the encryption algorithm is two-way. The decryption function is the inverse mathematical function $F^{-1}$ of the encryption function.

Various types of algorithms can be used for both the encryption and the decryption operations:

secret key algorithms, also called symmetric algorithms, meaning that the cleartext information is encrypted by the secret key (this is then the encryption key) and the encrypted information is decrypted by this same secret key used as a decryption key. Of course both the person performing the encryption and the person performing the decryption must have the same secret key.

Private/public key algorithms, also called asymmetric algorithms. This means that encryption is performed using the private key (or public key) as the encryption key, whereby this private key is known only to the subject performing the encryption, while for decryption the public key known to all the subjects (or the private key) is used as the decryption key.

In the prior art, the best known algorithms for the encryption and decryption operations were symmetric algorithms known as DES and asymmetric algorithms known as RSA.

The encryption/decryption DES algorithm is described in the Federal Information Processing Standards Publication of Jan. 15, 1977 by the United States National Bureau of Standards, in which DES signifies Data Encryption Standard.

The RSA algorithm is described in U.S. Pat. No. 4,405,829 by Rivest, Shamir, and Adleman.

At the present, there are two types of written attestations in the form of a set of binary information:
attestations whose information is encrypted,
and those whose information is in cleartext.

Encrypted attestations are protected against theft during transfer but have the basic drawback of first having to be decrypted by the recipient before they can be used.

In general, cleartext attestations are signed or sealed.

As can be seen in FIG. 1, an attestation is signed or sealed as follows:

For the signature, first a checksum of the total binary information in the attestation is calculated. This checksum, designated SC, is then encrypted by the mathematical function F using the private key CPR as the encryption key to obtain the signature SG. The recipient of the attestation provided with signature SG decrypts it, using signature SG as an input datum and a public key CPL as the encryption key, the decryption function being $F^{-1}$. Thus checksum SC is obtained at the output.

For calculation of the seal, after checksum SC has been calculated it is used as an input datum for the encryption operation by means of encryption function F, using a secret key CS as the encryption key. Seal SE is obtained at the output. The recipient of the attestation performs the decryption operation using this seal SE as the input datum and as the decryption key the same secret key CS that was used as the encryption key to obtain the seal. Checksum SC is again obtained at the output.

To make a signature, an asymmetric algorithm is used while a symmetric algorithm is used for sealing.

As soon as the recipient of the attestation has received it, he calculates a checksum SC' on the total binary information in the attestation excluding the signature. He then compares SC to SC'. If there is a match, this means that the total binary information in the attestation has not been modified Thus one can see that the sealing or signature consists of adding a check datum at the end of the attestation, which is added to the total binary information that defines the rights of the subject owning the attestation within the securitized data processing system.

Cleartext data stations, whether signed or sealed, are definitely protected against forgery (since no one can reproduce the signature other than the person who has the private key or secret key and no one other than the recipient can reproduce the seal) but are not protected against theft during transfer. They do have the advantage of being directly usable. To protect signed or sealed cleartext attestations during transfer from one subject to another, a supplementary protection system is necessary.

A supplementary protection system of a cleartext attestation is already known. Such a system was designed by the ECMA which defined either a sealed or a signed attestation which is protected by a secret value called validation key. This secret value is not part of the data in the attestation, but is used to calculate the seal or the signature. It is communicated confidentially by the entity delivering the attestation to its beneficiary. The beneficiary (the holder of the attestation) must thus give this key to any recipient so that the seal can be verified, proving that the attestation was not stolen.

According to the ECMA standard defining this type of attestation (ECMA Standard 138) the following is the procedure for obtaining an attestation. Reference is made to FIG. 2.

Let us consider an attestation requestor subject $S_1$ who is also defined as a user of the data processing system.

The attestation is obtained in three successive stages, which the following:

1) Requestor subject $S_1$ sends to security server SAU representing authority AU an attestation request indicating one or more actions he wishes to take within the system (printing payrolls for example) and optionally communicates thereto a protection datum, namely the aforesaid validation key. This validation key has previously been encrypted by the requestor.
2) Server SAU receives the attestation request and organizes it in the form of a set of pieces of binary information. It calculates the seal SE (or the signature) taking the validation key into account, the latter having first been decrypted for the server.
3) Server SAU transmits the attestation thus sealed or signed to requestor subject $S_1$.

If, in stage 1, the requestor subject has not communicated the protection datum, the server also furnishes a protection datum encrypted for the subject, in the reply to the attestation request.

To transmit the attestation to a subject $S_2$, $S_1$ sends a request to $S_2$, describing the actions he wishes to carry out or to have $S_2$ carry out. Like the attestation, this request is sealed or signed to guarantee its integrity during transfer, but by subject $S_1$ himself and not by an authority. The request thus established contains the attestation previously obtained from server SAU as well as the validation key encrypted for $S_2$. The latter decrypts the validation key. He calculates the checksum of the binary information in the attestation received, taking the value of the validation key into account. The sum thus calculated is compared to the decrypted value of the seal or signature in the attestation.

The drawback of the attestation model recommended by the ECMA using a validation key is that it brings in an element external to the attestation and hence when the attestation request is made it is necessary to encrypt the validation key either upon transfer from the requestor subject to the server when making the application or at the response of the server to the requestor subject. This may take several hundreds of milliseconds of calculation, which is deemed considerable in a data processing system and hence very expensive. Likewise, when an attestation is transmitted, it is necessary upon its receipt first to decrypt a key, namely the validation key, for the attestation seal to be verified.

In conclusion, the method recommended by the ECMA, although effective, is relatively complicated.

SUMMARY OF THE INVENTION

One objective of the present invention is precisely to simplify the method recommended by the ECMA. The method according to the invention applies to sealed or signed attestations and its original feature consists of introducing into the attestation itself the protection datum which will thus be in cleartext. To protect the attestation according to the invention, the holder of the attestation must prove that he knows a value uniquely associated with the protection datum. This associated value is called a check datum, or a check key.

According to the invention, the process for obtaining a cleartext attestation securitized by a requestor subject belonging to a distributed data processing system comprising a plurality of subjects and an authority delivering attestations, which is represented by at least one server acting on its behalf, with the subjects communicating with each other through a network, comprises the following successive stages:

1. the requestor subject addresses an attestation request to the authority and communicates at least one protection datum thereto,
2. the server organizes the attestation in the form of a set of binary information and calculates the seal or signature of the attestation, taking the protection datum into account, and 3. the server transmits the sealed or signed attestation thus organized to the requestor subject.

The invention is characterized in that:

a) in the first stage, the requestor subject chooses a check datum at random which he associates and links with the protection datum by a one-way relationship $F_{cp}$ then transmits in cleartext to the authority both an identification datum defining the relationship and the protection datum itself, b) in the second stage, the server introduces the protection datum and the identification datum into the attestation, then calculates the seal or signature, and c) in the third stage, the attestation is transmitted in cleartext to the requestor subject.

In a first preferred embodiment of the invention, the check datum and the protection datum are linked by a public-key and private-key mechanism, the check datum being a private key and the protection datum a public key.

In a second preferred embodiment of the invention, the check datum and the protection datum are linked by a one-way encryption system, with the check datum being a hidden key and the protection datum a revealed key.

In a third preferred embodiment of the invention, the first and second preferred embodiments of the invention are combined by introducing a first check datum and a first protection datum which are linked by a public-key and private-key mechanism in the same way as in the first embodiment, and a second check datum and a second protection datum which are linked by a one-way encryption system according to the second embodiment of the invention.

DESCRIPTION OF THE DRAWINGS

Other characteristics and advantages of the present invention will emerge from the following description provided as a nonlimiting example with reference to the attached drawings. In these drawings.

DETAILED DESCRIPTION OF THE INVENTION

The method according to the invention applies to sealed or signed attestations. It consists of introducing a protection datum into the attestation itself. This supplementary protection datum is in cleartext, like the rest of the information in the attestation, and not kept confidential as in the attestation protection system defined by the aforesaid ECMA Standard 138, another difference being of course the fact that the protection datum is internal to the attestation instead of being external.

Figure 3:
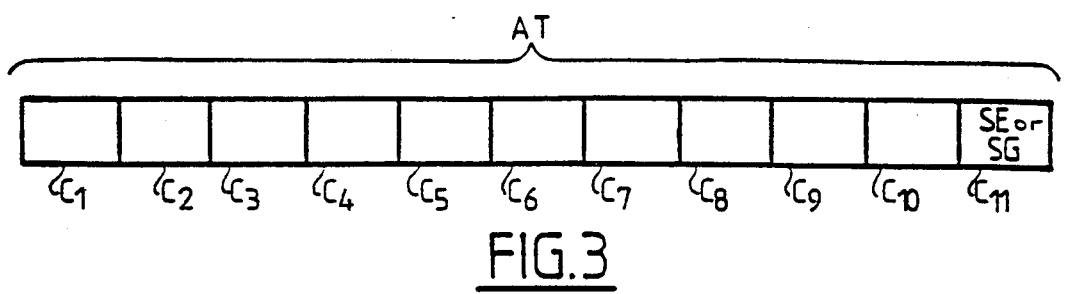
FIG. 3 shows how an attestation obtained by the method of the invention is organized.

FIG. 3, which shows how an attestation is organized, gives a better understanding of how this protection datum is situated within an attestation.

Attestation AT is composed of a plurality of pieces of binary information distributed in a succession of bit fields, namely in the embodiment shown in FIG. 3, fields $C_1$, $C_2$, ..., $C_5$, ..., $C_{11}$.

The attestation fields have the following meanings:

Field $C_1$ indicates the syntax version of the attestation (an attestation is written in a particular syntax of which several different successive versions may exist in the course of time).

Field $C_2$ indicates the user's privileges, or the rights which he possesses or does not possess, in other words the nature of the operations he is entitled or not entitled to carry out, for example the right to access the salaries of company personnel for the head of payroll, or a ban on changing salaries for the employees in the same department.

Figure 1:
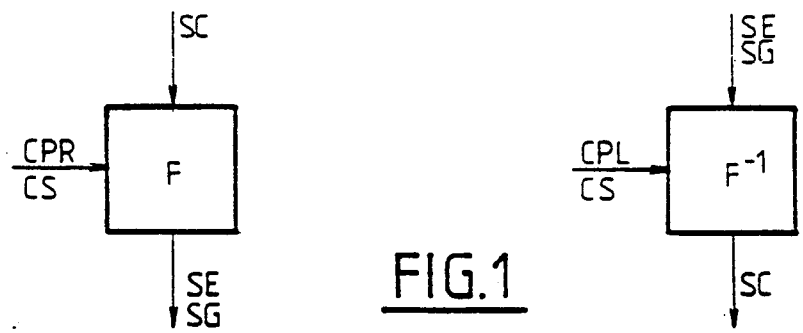
FIG. 1 shows how encryption and decryption operations are conducted according to a symmetric or asymmetric algorithm.
Figure 2:
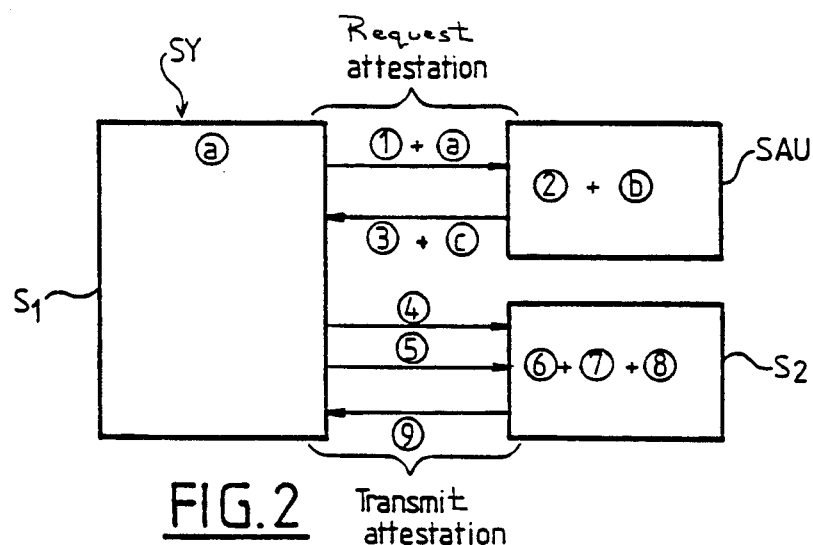
FIG. 2 is a simplified schematic diagram showing the various stages of the method according to the invention both for the attestation request and for transmission thereof.

Field $C_3$ indicates the attributes of the initiator, namely the person first requesting the attestation, i.e. subject $S_1$ in FIG. 2. These attributes describe the various features of the system used by this subject (for example the location of the system, the type of equipment used such as terminal with badge reader, etc.).

Field $C_4$ indicates the attributes of the recipient, namely the features of the one (in the same way as for $C_3$) for whom the attestation is intended, for example $S_2$ in FIG. 2.

Field $C_5$ contains the protection datum. This datum is in fact composed of two parts: a protection key and an identifier of the protection method using the key. This method will be defined later in the Specification. The protection key contains a large number of bits, 512 or more, in a preferred embodiment of the invention.

Field $C_6$ indicates the date on which the attestation was created. This information allows the use of the attestation to be restricted in time, in combination with the next field $C_7$.

Field $C_7$ indicates the validity period of the attestation. The combination of fields $C_6$ and $C_7$ thus defines the period for which the attestation is valid, starting from its date of creation.

Field $C_8$ contains an identifier of the attestation, i.e. it indicates the number of the attestation delivered by server SAU (this server numbers each attestation it issues).

Field $C_9$ contains recovery identifier used for example to revoke an attestation when this becomes necessary, for example when user $S_1$ has his rights taken away.

Field $C_{10}$ identifies the authority AU and possibly the corresponding server SAU that issues the attestation.

Field $C_{11}$ contains seal SE or signature SG. This field contains the identifier of the method used to calculate the seal or signature SE or SG, and the value of seal SE or signature SG. It will be remembered that the value of seal SE or signature SG is calculated by determining the checksum of the total binary information contained in the fields described above with the exception of field $C_{11}$, namely fields $C_1$ to $C_{10}$. It will be seen that, contrary to the attestation model recommended by ECMA 138, using an external validation key, calculation of the attestation seal or signature brings in no element external to the attestation. Since the protection key is actually in the attestation itself, it is taken into account when calculating the seal or signature just as are the other elements of the attestation contained in the other fields.

According to the invention, the subject requesting the attestation and, in general, any later holder of the attestation, must prove that he knows a value associated uniquely with the value of the protection key in the attestation. This associated value is in fact a check datum and is called check key. There is a relationship $F_{cp}$ between the check key and the protection key which is indicated by the identifier of the method to be used to verify the protection key, an identifier contained in field $C_5$, with the protection key.

If the protection key and check key are designated CP and CL respectively, the following relationship exists between them:

$$CP = F_{cp}(CL).$$

Check key CL may be of two kinds:

1) In the case of a public-key and private-key mechanism, it may be a private key CPR, the private key then being related to public key CPL by the relationship:

$$CPL = F_{cp}(CPR),$$

where $F_{cp}$ is a relationship between the public key and the private key such that if the public key and function $F_{cp}$ (which are given in cleartext in field $C_5$ of the attestation) are known, it is difficult to find the private key in a reasonable time, especially as public key CPL contains a large number of bits—512 or more—as indicated above. This is indeed a fundamental feature of the mathematical calculations which, in current practice, connect private keys to public keys. Thus, for a highly powerful computer in the supercomputer category, it would take several years to find the private key CPR associated with the public key starting from knowledge of public key CPL and function $F_{cp}$.

2) Within the framework of a one-way encryption system, the check key can be a hidden key CCH, and the public key is known as revealed key CRV in which case it is linked to the hidden key by the relationship $CRV = F_{cp}(CCH)$.

Since function $F_{cp}$ is a one-way function, it is difficult to find the hidden key CCH in a reasonable time (see above) when revealed key CRV and function $F_{cp}$ are known.

It is also possible to protect an attestation by the combination of the two techniques mentioned above, namely for the check key, which is either a public key or a revealed key, to be associated either with a private key or with a hidden key. In this case, field $C_5$ then contains a first protection key called public key CPL and a second protection key called revealed key CRV, each associated with an indicator specifying the corresponding protection method, namely either the public key and private key mechanism or the one-way encryption system. In conclusion, it may be said that possession of an attestation is characterized by possession of a private key and/or possession of a hidden key.

The essential feature of the method according to the invention having been defined above, it is now important to specify the various stages of the method for obtaining the attestation according to the invention. In the same way as the method defined by the ECMA 138 Standard, this method comprises three stages analogous to those defined in the latter, these three stages each having supplementary operations, namely a, b, c for the first, second, and third stages, respectively as indicated below:

a) (referring to FIG. 2). In the first stage, requestor subject $S_1$ chooses at least one check key which he associates and links with the protection key by one-way relationship $F_{cp}$, then he transmits in cleartext to the authority an identification datum defining relationship $F_{cp}$ and the protection key.

If the check key is a hidden key CCH, subject $S_1$ determines it by choosing a large binary number at random. He then calculates the protection key, namely the revealed key, using the formula:

$$CRV = F_{cp}(CCH).$$

He then communicates to the authority the value of this protection key without encrypting it.

If a private key is used as a check key, subject $S_1$ requesting the attestation chooses at random a public key/private key CPL/CPR pair. He then communicates to server SAU the value of public key CPL without encrypting it.

In the case of combined use of the two above techniques, hidden key or private key, subject $S_1$ chooses at random both a large binary number which will be hidden key CCH and a public key/private key CPL/CPR pair. He then calculates revealed key CRV corresponding to the hidden key by the formula:

$$CRV = F_{cp}(CCH).$$

He then communicates to server SAU who issues the attestation, the value of revealed key CRV as well as the value of public key CPL without encrypting them.

b) In the second stage, server SAU introduces the protection key and the identification datum defining the method to be used to verify the protection key within the attestation itself, then calculates seal SE or signature SG taking these into account.

In the case when a hidden key CCH is used as the check key, the authority delivering the attestation introduces revealed key CRV and the identifier of relationship $F_{cp}$ into the attestation and calculates the seal or signature taking into account revealed key CRV and its identifier.

If a private key CPR is used as the check key, server SAU introduces public key CPL which it has received from subject $S_1$ into the attestation as well as the corresponding identifier, and calculates seal SE or signature SG taking public key CPL and the identifier into account.

c) In the third stage, the attestation is transmitted in cleartext by server SAU to the requestor subject. (This is true whatever the technique used—first, second, or combination thereof). It will thus be seen that, by comparison to the method defined in ECMA Standard 138, the protection key, here included in the attestation, is transmitted in cleartext both from the requestor subject to the server and from the server to the requestor subject. The method according to the invention thus avoids encryption of the key.

In the case where the combination of two techniques is used (see above), in the third stage, the authority having organized the attestation sends it in cleartext to requestor subject $S_1$. The public key and private key are thus transmitted in cleartext within the attestation not only from the requestor subject to the authority but also vice versa.

We will now consider the problem of transmitting an attestation from subject $S_1$ benefiting from an attestation to an attestation recipient such as subject $S_2$ who may be either an individual or an application program that can carry out specific tasks for requestor subject $S_1$.

The attestation is transmitted in the following stages:

4. The beneficiary of attestation $S_1$ prepares a request for the recipient subject, also called third party subject or more simply third party, namely $S_2$.

After operation 4, subject $S_1$ then accomplishes either operations 5 to 7 or operations 8 to 13 depending on whether the check key is a private key or the check key is a hidden key.

5. If the check key is a private key CPR, the subject benefiting from attestation $S_1$ organizes a message formed by the request written in operation 4 and the cleartext attestation. This message specifies the use to be made of the attestation, namely it defines the tasks that subject $S_2$ must accomplish. $S_1$ signs this message with the private key using an asymmetric algorithm, then sends it to $S_2$.

6. Third party subject $S_2$, who is in possession of public key CPL transmitted within the attestation, verifies the signature on the message transmitted thereto.

7. Subject $S_2$ takes into account the attestation transmitted thereto by subject $S_1$ if the verification proves to be positive. Subject $S_2$ then informs attestation beneficiary $S_1$ that he is taking his attestation into account since $S_1$ actually proved that he had the private key.

8. If the check key is a hidden key CCH, beneficiary $S_1$ organizes a message composed of the request written in 4 and the cleartext attestation. The message defines the tasks that $S_2$ is to accomplish. $S_1$ seals this message by the hidden key using a symmetric algorithm, then sends it to $S_2$.

9. Beneficiary $S_1$ performs an encryption operation on hidden key CCH (with a function different from $F_{cp}$) and thus transmits it confidentially to third party $S_2$.

10. When the third party receives this encrypted hidden key, he decrypts it.

11. He calculates the protection key from the hidden key thus deciphered in operation 10 and one-way encryption function $F_{cp}$ and calculates the seal on the message received.

12. He compares the protection key thus calculated with the value of the protection key transmitted thereto within the attestation itself in operation 8 and checks whether the seal is correct.

13. He takes the attestation into account when the calculated protection key and the transmitted protection key are the same and if the seal calculated from the message received is correct, proving that beneficiary $S_1$ of the attestation is in possession of the check key.

When the use of the two techniques—private key/public key mechanism and one-way encryption system—are combined, the attestation is transmitted as follows:

Beneficiary $S_1$ sends the message by the method described in operations 4 and 5, adding to the attestation a revealed key CRV. The third party subject thus receives an attestation comprising both a public key and a revealed key.

$S_2$ thus receives a signed message and in parallel receives hidden key CCH encrypted by $S_1$ in an operation similar to 9.

$S_2$ must thus perform two checks:
a) check whether the signature is right (analogous to operation 6),
b) check that the encrypted hidden key corresponds to the revealed key (analogous to operations 10, 11, 12).

$S_2$ takes the attestation into account if these two checks are positive.

Figure 4:
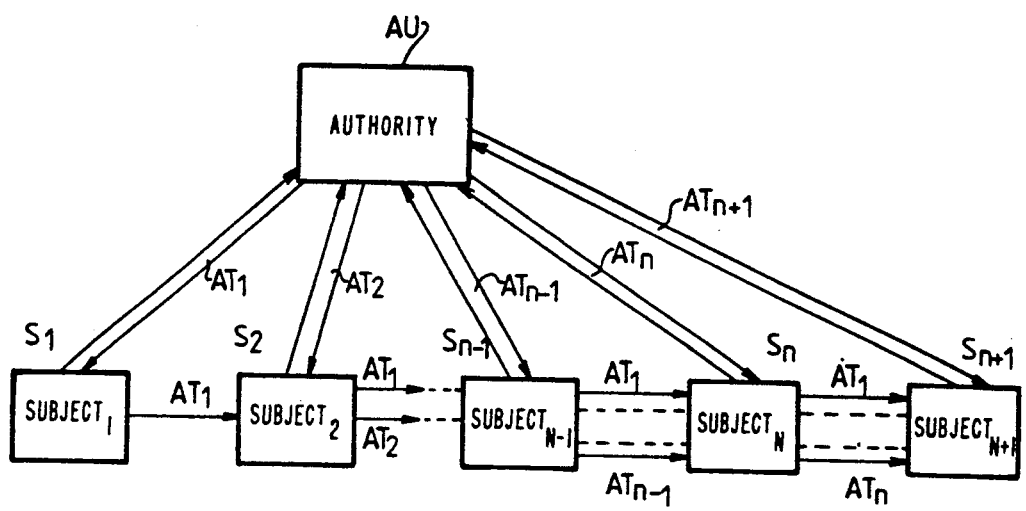
FIG. 4 shows a variant of the method according to the invention applying to the obtaining of attestations in a chain.

In certain cases, it may be necessary to present simultaneously to one and the same third party subject several different attestations $AT_1$ through $AT_n$ (see FIG. 4). This occurs in particular when the following scenario arises: the person receiving a request to perform a particular task, for example subject $S_2$, is not necessarily able to respond, i.e. to accomplish the whole of the task requested by attestation beneficiary $S_1$. In this case, third party subject $S_2$ transmits the request to another party, for example subject $S_3$. This party may require presentation of two attestations, namely attestation $AT_1$ from the first requestor, namely first beneficiary $S_1$, as well as attestation $AT_2$ from the second requestor, namely subject $S_2$. The latter will have asked authority AU (which may be represented by a server other than server SAU) for this attestation according to a scenario exactly identical to that used for attestation request $AT_1$ by subject $S_1$, and described above.

The method recommended above would require duplication of the mechanisms presented, encryption of check data or setting up of signed messages, decryption, calculation of checksums, etc. However, when the chain of requestors $S_1$, $S_2$, $S_3$, ... $S_i$ ..., $S_{n-1}$, $S_n$ is relatively large and contains $n-1$ intermediates, it may be useful to simplify the mechanism for obtaining and transmitting attestations.

In this case the attestations are linked together such that each new attestation $AT_n$ can be chained to the previous attestation $AT_{n-1}$. Thus one obtains a chain of attestations $AT_1 \ldots AT_n$. This chaining mechanism has the following properties:
the last holder $S_n$ of the attestation chain has a set of attestations contained in the chain, namely $AT_1$ to $AT_n$,
an intermediate attestation holder $S_i$ who has all the attestations he has received $AT_1, \ldots, AT_i$, may in no case have available any attestations added subsequently to the chain of attestations already present by others than himself. In other words, there is no way in which he may possess attestations $AT_{i+1}$, $AT_{i+2}$, etc.

This chaining mechanism requires the addition of a supplementary value to each attestation $AT_1$ to $AT_n$, called chaining value. This chaining value CV is not necessary when the chain contains only one attestation, namely $AT_1$ (mechanism described above) but is necessary when a second attestation $AT_2$ is chained to the first.

The chaining value links the check keys of the various attestations with each other. If the check key attached to attestation $AT_n$ of rank n is called check key $CL_n$, the check key associated with attestation $AT_{n-1}$ of rank $n-1$ is called check key $CL_{n-1}$, and the chaining value of rank n is called $CV_n$, we now have a linking relationship $F_L$ between chaining value $CV_n$ and its two check keys $CL_n$ and $CL_{n-1}$ which is the following:

$$CV_n = F_L(CL_n, CL_{n-1}).$$

Figures 5, 5A:
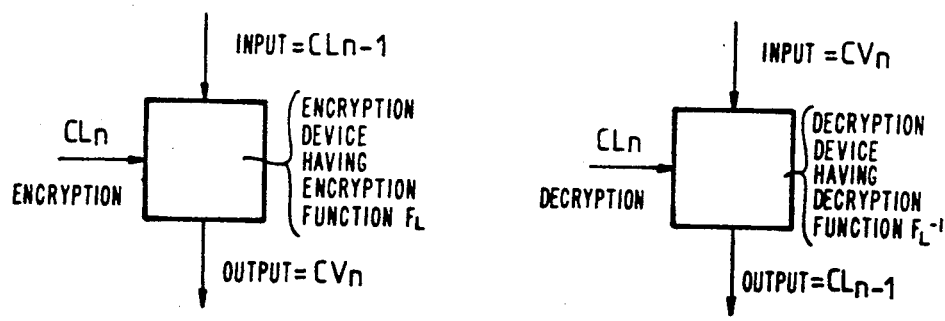
FIGS. 5 and 5A shows how chaining values and check keys are linked in a chain of attestations.

$F_L$ is a two-way encryption function using check key $CL_n$ as an encryption key, and check key $CL_{n-1}$ as the input (see FIG. 5). Function $F_L$ allows all the chaining values to be calculated and may be identical for all the operations calculating all the chaining values. It may be chosen by first subject $S_1$ and will be used by all the other subjects to calculate the chaining values. This encryption function is hence chosen arbitrarily and is accomplished by means of logic circuits or programs known in the prior art.

The two-way nature of function $F_L$ means that once check key $CL_n$ and chaining value $CV_n$ are known it is possible to deduce check key $CL_{n-1}$ by the following relationship:

$$CL_{n-1} = F_L^{-1}(CL_n, CV_n),$$

$F_L^{-1}$ being the decryption function corresponding to encryption function $F_L$ which uses check key $CL_n$ as the decryption key and chaining value $CV_n$ as the input (FIG. 5A).

The method of transmitting a chain of attestations has the following characteristics:

I—To transmit a set of attestations $AT_1$ through $AT_n$, it is no longer necessary individually to encrypt each check key associated with each attestation, but only to encrypt the last check key, namely $CL_n$, so that recipient $S_{n+1}$ can decrypt it. $S_n$ then has to perform only two encryption operations to transmit and add an attestation to the chain instead of the same number of individual encryption operations as there are attestations to be transmitted, n. A third party subject $S_n$ will then encrypt the last check key $CL_n$ and will also calculate the right chaining value, namely will perform the operation $CV_n = F_L(CL_n, CL_{n-1})$ where check key $CL_{n-1}$ is transmitted thereto, encrypted by subject $S_{n-1}$ ($S_n$ will thus decrypt it), check key $CL_n$ being chosen by $S_n$ himself.

II—To check a set of attestations, it is no longer necessary individually to decrypt each check key associated with each attestation but only to decrypt the last check key. The other check keys would then be calculated by chaining values according to the formula:

$$CL_{n-1} = F_L^{-1}(CL_n, CV_n) \text{ cited above.}$$

An intermediate of rank n in the chain must thus perform a decryption operation of the last check key, then n−1 decryption operations to find the various values of all the check keys: this constitutes a total of n identical operations or n individual operations for decrypting check keys according to the classical method not using chaining values.

It can be seen that the method according to the invention allowing a set of attestations to be transmitted by means of chaining values $CV_n$ saves a large number of operations essentially during transmission of a set of attestations.

Moreover the method of transmitting a chain of attestations according to the invention contains a number of features, which are the following:

it is not possible to delete or replace the first attestations in a chain and keep the following attestations.

It is not possible for an intermediate of rank n to benefit from the use of an attestation $AT_{n+1}$ with rank n+1.

It is possible to shorten the attestation chain by deleting the last n attestations $AT_1 \ldots AT_{n-1}$, but without being able to change the order of the remaining attestations.

Modifications and substitutions by one of ordinary skill in the art are considered to be within the scope of the present invention which is not to be limited except by the claims which follow.

We claim:

1. A method for providing an attestation in a data processing system said method comprising the steps of:
choosing, at random, a check datum;
relating said check datum to at least one protection datum through a one-way relationship said one way relationship corresponding to a first one of:
  (a) a public key/private key algorithm; and
  (b) a one way encryption system;
sending an attestation request to a server;
transmitting in cleartext from at least one requestor subject to said server, said attestation request and an identifier, said identifier defining said one-way relationship between said check datum and said protection datum;
forming, in the server, an attestation in the form of a set of pieces of binary information wherein said attestation includes said at least one protection datum and said identifier;
calculating, in the server at least one of:
  a seal of attestation; and
  a signature of attestation; wherein said step of calculating takes into account said at least one protection datum and said identifier; and
transmitting the attestation in cleartext from said server to the at least one requestor subject.

2. The method of claim 1 wherein said check datum corresponds to a private key and said at least one protection datum corresponds to a public key and wherein said check datum and said at least one protection datum are related by an encryption function.

3. The method of claim 2 wherein the step of sending an attestation request to a server includes the step of:
said requestor subject requesting an attestation from said server for the benefit of a third party subject, said third party subject being coupled to said data processing system; and
wherein, after the step of transmitting the attestation to said requestor subject, the method further comprises steps of:
preparing, by said requestor subject, a cleartext request to be transmitted to said third party subject;
forming by said requestor subject, a message including said cleartext request and said attestation, specifying the usage that may be made of said attestation;
signing said message, by said requestor subject, with said private key to provide a signed cleartext message having a signature;
transmitting said signed cleartext message from said requestor subject to said third party subject;
verifying, by said third party subject, the signature of said signed cleartext message; and
accepting, by said third party subject, said attestation of said signed cleartext message upon the verification of the signature provided in the message signing step of the signed cleartext message.

4. The method according to claim 3 wherein:

a plurality n of requestor subjects $S_1$-$S_n$ each request an attestation of said server, each of the n attestations being transmitted to a third party subject ($S_{n+1}$), said method further comprising the steps of:

receiving a preceding check datum $CL_{n-1}$ from a preceding subject $S_{n-1}$ by subject $S_n$;

choosing, by subject $S_n$, a next check datum $CL_n$;

calculating, by subject $S_n$, a chaining value $CV_n$ related to the next check datum and to the preceding check datum through a two-way encryption function wherein in said two way encryption function the next check datum corresponds to an encryption key and the preceding check datum corresponds to an input value;

transmitting, by said subject $S_n$, said chaining value to said sever;

introducing said chaining value by said server into said attestation; and calculating a first one of:

(a) a seal of said attestation; and (b) a signature of said attestation; wherein said calculating step utilizes said chaining value introduced into said attestation during said introducing step.

5. The method of claim 4 further comprises the step of:

verifying each of the n attestations, wherein said verifying step includes the steps of:

decrypting, by a first one of the plurality of subjects, the received preceding check datum $CL_{n-1}$; and calculating by said first one of said plurality of subjects a current check datum $CL_n$ from at least one chaining value $CV_n$ introduced into said attestation and from the decryption of said two-way encryption function.

6. The method of claim 1 wherein said check datum and said at least one protection datum are encrypted by a one-way encryption system, and whereby the check datum is a hidden key and the at least one protection datum is a revealed key.

7. The method of claim 6 wherein said requestor subject requests an attestation from said server for the benefit of a third party subject coupled to said data processing system and wherein after the step of transmitting the attestation to said requestor subject, the method further comprises the steps of:

preparing, by said requestor subject, a cleartext request to be transmitted to said third party subject;

forming, by said requestor subject, a cleartext message, said cleartext message including said cleartext request and said attestation, specifying the usage that may be made of said attestation;

sealing said cleartext message, by said requestor subject, with said hidden key to provide a sealed cleartext message;

transmitting said sealed cleartext message from said requestor subject to said third party subject;

encrypting the check datum represented by said hidden key;

transmitting said encrypted check datum from said requestor subject to said third party subject;

decrypting, by said third party subject, said encrypted check datum;

calculating, by said third party subject, a protection datum from said decrypted check datum and from said one-way encryption function;

calculating, by said third party subject, the seal on the sealed cleartext message;

comparing, by said third party subject, the calculated protection datum with the value of the protection datum transmitted within the attestation, and verifying whether the seal of the sealed cleartext message calculated in said seal calculating step is correct; and accepting the attestation when the following two conditions are met;

(a) the comparing step indicates the transmitted protection datum and the calculated transmission datum are equal; and (b) the seal calculated in the seal calculating step is correct.

8. The method according to claim 7 in which a plurality n of requestor subjects $S_1$-$S_n$ each request an attestation of said server, each of the n attestations being transmitted to a third party subject ($S_{n+1}$), said method further comprising the steps of:

receiving a preceding check datum $CL_{n-1}$ from a preceding subject $S_{n-1}$ by subject $S_n$;

choosing, by subject $S_n$, a next check datum $CL_n$;

calculating, by subject $S_n$, a chaining value $CV_n$ related to the next check datum and to the preceding check datum through a two-way encryption function wherein in said two way encryption function the next check datum corresponds to an encryption key and the preceding check datum corresponds to an input value;

transmitting, by said subject $S_n$, said chaining value to said server;

introducing said chaining value by said server into said attestation; and calculating a first one of:

(a) a seal of said attestation; and (b) a signature of said attestation; wherein said calculating step utilizes said chaining value introduced into said attestation during said introducing step.

9. The method of claim 8 further comprising the step of:

verifying each of the n attestations, wherein said verifying step includes the steps of:

decrypting, by said a first one of said plurality of subject $S_n$ a received preceding check datum $CL_{n-1}$; and calculating, by said first one of said plurality if requestor subjects a current check datum $CL_n$ from at least one chaining value $CV_n$ introduced into said attestation and from the decryption of said two-way encryption function.

10. The method of claim 1 wherein said at least one protection datum is a first protection datum and said check datum is a first check datum and wherein said attestation further includes:

a second protection datum;

a second check datum; wherein the first check datum and the first protection datum are related by a public key/private key algorithm and the first protection datum includes a private key and the first protection datum includes a public key; and wherein the second check datum includes a hidden key and the second protection datum includes a revealed key, and the second check datum and the second protection datum are related through a one-way encryption function.

* * * * *